US012811247B2

(12) United States Patent
Fan

(10) Patent No.: US 12,811,247 B2
(45) Date of Patent: Nov. 24, 2026

(54) SEPARATOR INCLUDING SUBSTRATE WITH COATING HAVING CORE-SHELL POLYMER BINDER PARTICLE LARGER THAN INORGANIC PARTICLE, AND ELECTROCHEMICAL DEVICE INCLUDING THE SAME

(71) Applicant: Ningde Amperex Technology Ltd., Ningde (CN)

(72) Inventor: Xiaohe Fan, Ningde (CN)

(73) Assignee: Ningde Amperex Technology Ltd., Ningde (CN)

(*) Notice: Subject to any disclaimer, the term of this patent is extended or adjusted under 35 U.S.C. 154(b) by 790 days.

(21) Appl. No.: 18/303,877

(22) Filed: Apr. 20, 2023

(65) Prior Publication Data

US 2023/0261322 A1 Aug. 17, 2023

Related U.S. Application Data

(63) Continuation of application No. 16/652,472, filed as application No. PCT/CN2020/078453 on Mar. 9, 2020, now abandoned.

(30) Foreign Application Priority Data

May 8, 2019 (CN) ........................ 201910380301.4

(51) Int. Cl.
*H01M 50/446* (2021.01)
*H01G 11/22* (2013.01)
(Continued)

(52) U.S. Cl.
CPC .......... *H01M 50/446* (2021.01); *H01G 11/22* (2013.01); *H01G 11/52* (2013.01);
(Continued)

(58) Field of Classification Search
CPC ............. H01M 50/446; H01M 50/417; H01M 50/457; H01M 50/449; H01M 50/42;
(Continued)

(56) References Cited

U.S. PATENT DOCUMENTS 5,525,444 A 6/1996 Ito
2006/0216608 A1* 9/2006 Ohata ................ H01M 50/446 429/251

(Continued)

FOREIGN PATENT DOCUMENTS

CN 1659726 A 8/2005
CN 103904276 A 7/2014

(Continued)

OTHER PUBLICATIONS

Stewart, K. “significant figures.” Encyclopedia Britannica, Mar. 26, 2026. https://www.britannica.com/science/significant-figures. (Year: 2026).*

(Continued)

*Primary Examiner* — Sean P Cullen
(74) *Attorney, Agent, or Firm* — Maier & Maier, PLLC

(57) ABSTRACT

A separator includes a porous substrate and a first coating located on at least one surface of the porous substrate. The first coating includes a first polymer binder and first inorganic particles, and the first polymer binder comprising core-shell structured particles. 0.3×Dv50 of the first polymer binder≤Dv50 of the first inorganic particles≤0.7×Dv50 of the first polymer binder. Dv50 represents a particle size which reaches 50% of a cumulative volume from a side of small particle size in a granularity distribution on a volume basis The first inorganic particles are used in the first coating, ensuring that the first polymer binder has a bonding function, electrolyte transport is promoted, and the rate performance of the electrochemical device is improved.

18 Claims, 3 Drawing Sheets

(51) Int. Cl.

| | |
|---|---|
| ***H01G 11/52*** | (2013.01) |
| ***H01M 10/0525*** | (2010.01) |
| ***H01M 50/417*** | (2021.01) |
| ***H01M 50/42*** | (2021.01) |
| ***H01M 50/431*** | (2021.01) |
| ***H01M 50/449*** | (2021.01) |
| ***H01M 50/457*** | (2021.01) |

(52) U.S. Cl.
CPC ..... *H01M 10/0525* (2013.01); *H01M 50/417* (2021.01); *H01M 50/42* (2021.01); *H01M 50/431* (2021.01); *H01M 50/449* (2021.01); *H01M 50/457* (2021.01)

(58) Field of Classification Search
CPC .. H01M 50/431; H01M 50/052; H01G 11/22; H01G 11/52
USPC .......................................... 429/144, 251, 254
See application file for complete search history.

(56) References Cited

U.S. PATENT DOCUMENTS

| | | | | |
|---|---|---|---|---|
| 2017/0162848 | A1 | 6/2017 | Pan et al. | |
| 2017/0162850 | A1 | 6/2017 | Murakami | |
| 2017/0200932 | A1 | 7/2017 | Sasaki | |
| 2018/0019457 | A1 | 1/2018 | Alharizah | |
| 2018/0053963 | A1* | 2/2018 | Tanaka | H01M 10/0525 |
| 2020/0127263 | A1* | 4/2020 | Annaka | H01M 10/052 |
| 2020/0203690 | A1 | 6/2020 | Kwon et al. | |

FOREIGN PATENT DOCUMENTS

| | | | | | |
|---|---|---|---|---|---|
| CN | 104953128 | A | | 9/2015 | |
| CN | 105273444 | A | | 1/2016 | |
| CN | 105440770 | A | | 3/2016 | |
| CN | 108389999 | A | | 8/2018 | |
| CN | 109088030 | A | | 12/2018 | |
| CN | 109167011 | A | * | 1/2019 | H01M 50/409 |
| CN | 109659470 | A | * | 4/2019 | H01M 50/449 |
| CN | 109722124 | A | | 5/2019 | |
| JP | 2007220452 | A | | 8/2007 | |
| JP | 201625093 | A | | 2/2016 | |
| JP | 2017525100 | A | | 8/2017 | |
| KR | 1020180003177 | A | | 1/2018 | |
| KR | 1020180017526 | A | | 2/2018 | |
| KR | 1020190044529 | A | | 4/2019 | |
| TW | 201912736 | A | | 4/2019 | |
| WO | 2015198534 | A1 | | 12/2015 | |
| WO | WO-2016152026 | A1 | * | 9/2016 | H01M 10/058 |
| WO | WO-2018198940 | A1 | * | 11/2018 | H01M 10/058 |
| WO | 2019078650 | A1 | | 4/2019 | |

OTHER PUBLICATIONS

Office Action dated Feb. 7, 2023, in corresponding Korean Application No. 10-2021-7009261, 10 pages.

Decision to Grant a Patent dated Nov. 22, 2022, in corresponding Japanese Application No. 2021-517395; 5 bages.

Decision of Refusal dated Jun. 14, 2022, in corresponding Japanese Application No. 2021-517395; 6 pages.

Office Action issued Jun. 8, 2022 in Japanese Patent Application No. 2021-517395 (with English translation); 6 pgs.

English machine translation of Chen (CN 105273444 A) (Year: 2016).

English machine translation of Wang Mingwang et al. (CN 109659470 A 1) (Year: 2019).

Office Action issued on Jan. 6, 2022, in connection with corresponding Chinese Application No. 201910380301.4 (7 pp., including machine-generated English translation).

Office Action issued on Mar. 29, 2021, in connection with corresponding Chinese Application No. 201910380301.4 (15 pp., including machine-generated English translation).

Office Action issued on Aug. 19, 2021, in connection with corresponding Chinese Application No. 201910380301.4 13 pp., including machine-generated English translation).

Extended European Search Report issued on May 17, 2021, in connection with corresponding European Application No. 20712432.2; 9 pages.

Office Action issued on Dec. 16, 2021, in connection with corresponding Indian Application No. 202017014536 (5 bp., including English translation).

Office Action issued on Jan. 25, 2022, in connection with corresponding Japanese Application No. 2021-517395 (11 pp., including machine-generated English translation).

International Search Report issued on Jun. 9, 2020, in connection with corresponding International Patent Application No. PCT/CN2020/078453 (8 pp., including machine-generated English translation).

* cited by examiner

SEPARATOR INCLUDING SUBSTRATE WITH COATING HAVING CORE-SHELL POLYMER BINDER PARTICLE LARGER THAN INORGANIC PARTICLE, AND ELECTROCHEMICAL DEVICE INCLUDING THE SAME

CROSS-REFERENCE TO RELATED APPLICATIONS

This application is a continuation application of U.S. patent application Ser. No. 16/652,472, filed on Mar. 31, 2020, which claims the benefit of priority of International Application No. PCT/CN2020/078453, filed on Mar. 9, 2020, which claims the benefit of priority of Chinese patent application 201910380301.4, filed on May 8, 2019, the contents of which are incorporated herein by reference in its entirety.

FIELD

The subject matter herein generally relates to a separator and an electrochemical device using the separator.

BACKGROUND

A polymer binder of a separator is pressed and adhered to form a film after swelling in an electrolyte and hot pressing in formation process, which affects the rate performance and the cycle performance of electrochemical devices, such as lithium-ion batteries, and may result in lithium precipitation of the negative electrode during the cycle. The polymer binder is a weakly polar polymer binder, which has poor endophilicity for the electrolyte, resulting in difficulty in transporting the electrolyte, and poor electrolyte wetting in high-pressure and dense material systems.

Two methods are generally used to improve the above discussed features. First, the degree of crosslinking of the polymer binder is increased to reduce the degree of swelling of the polymer binder. Second, the formation process conditions are adjusted, for example, reducing the temperature of the formation process, reducing the pressure of the formation process, and shortened the time of the formation process. However, when the degree of crosslinking of the polymer binder is increased, the rigidity of the particles of the polymer binder is increased, which results in a decrease in a bonding force of the polymer binder. In addition, it may be difficult to precisely adjust the degree of swelling by changing the degree of crosslinking. By adjusting the formation process conditions, an interface adhesive force between the separator and the electrode plate is reduced, and the electrochemical device is easily deformed. In addition, when a flatness of an interface of the electrochemical device is reduced, lithium precipitation of the interface is likely to occur, which further affects the cycle performance of the electrochemical device.

SUMMARY

In the present disclosure, a binder coating including inorganic particles is formed on a porous substrate of a separator, which prevents the binder from being pressed and adhered to form a film after swelling in the electrolyte and being hot pressed in the formation process, and endophilicity of the separator for the electrolyte is improved, which promotes electrolyte transport.

The present disclosure provides a separator including a porous substrate and a first coating disposed on at least one surface of the porous substrate, wherein the first coating includes a first polymer binder and first inorganic particles, the first polymer binder includes core-shell structured particles.

In some embodiments, the separator further includes a second coating arranged between the porous substrate and the first coating, the second coating includes a second polymer binder and second inorganic particles.

In some embodiments, the first coating further includes an auxiliary binder, and a ratio of mass of the first polymer binder, the first inorganic particles, and the auxiliary binder is 10~80:85~5:5~15.

In some embodiments, the first coating includes a mono layer of particles.

In some embodiments, the first polymer binder satisfies the following formulas (1) to (3):

$$300\ \text{nm} \le Dv50 \le 5000\ \text{nm} \qquad \text{formula (1);}$$

$$Dv90 \le 1.5 \times Dv50 \qquad \text{formula (2);}$$

$$Dn10 \le 200\ \text{nm} \qquad \text{formula (3);}$$

wherein Dv50 represents a particle size which reaches 50% of a cumulative volume from a side of small particle size in a granularity distribution on a volume basis, Dv90 represents a particle size which reaches 90% of a cumulative volume from a side of small particle size in a granularity distribution on a volume basis, and Dn10 represents a particle size which reaches 10% of a cumulative number from the side of small particle size in a granularity distribution on a number basis.

In some embodiments, the separator satisfies the following formula (4):

$$0.3 \times Dv50 \text{ of the first polymer binder} \le Dv50 \text{ of the first inorganic particles} \le 0.7 \times Dv50 \text{ of the first polymer binder formula} \qquad (4).$$

In some embodiments, a core of the first polymer binder is a polymer formed by polymerizing of monomers selected from a group consisting of ethyl acrylate, butyl acrylate, ethyl methacrylate, styrene, chlorostyrene, fluorobenzene ethylene, methylstyrene, acrylic acid, methacrylic acid, maleic acid, and any combination thereof.

In some embodiments, a shell of the first polymer binder is a polymer formed by polymerizing of monomers selected from a group consisting of methyl acrylate, ethyl acrylate, butyl acrylate, methyl methacrylate, ethyl methacrylate, butyl methacrylate, ethylene, chlorostyrene, fluorostyrene, methylstyrene, acrylonitrile, methyl acrylonitrile, and any combination thereof.

In some embodiments, the first inorganic particles are selected from a group consisting of aluminium oxide, silicon dioxide, magnesium oxide, titanium oxide, hafnium dioxide, tin oxide, cerium oxide, nickel oxide, zinc oxide, calcium oxide, zirconia, yttrium oxide, silicon carbide, boehmite, aluminum hydroxide, magnesium hydroxide, calcium hydroxide, barium sulfate, and any combination thereof.

The present disclosure further provides an electrochemical device including a positive electrode plate, a negative electrode plate, and the above separator arranged between the positive electrode plate and the negative electrode plate.

In the present disclosure, the first inorganic particles are used in the first coating, ensuring that the first polymer binder has bonding function, electrolyte transport is promoted, and a rate performance of the electrochemical device is improved.

BRIEF DESCRIPTION OF THE DRAWINGS

Implementations of the present disclosure will now be described, by way of embodiments, with reference to the attached figures.

DETAILED DESCRIPTION

Figure 1:
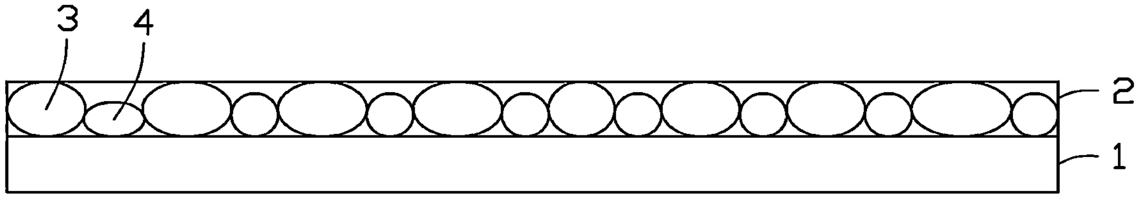
FIG. 1 is a schematic view of an embodiment of a separator according to the present disclosure.

Implementations of the disclosure will now be described, by way of embodiments only, with reference to the drawing. The disclosure is illustrative only, and changes may be made in the detail within the principles of the present disclosure. It will, therefore, be appreciated that the embodiments may be modified within the scope of the claims.

FIG. 1 illustrates an embodiment of a separator including a porous substrate 1 and a first coating 2 arranged on at the porous substrate 1. The first coating 2 is located on one surface of the porous substrate 1. In other embodiments, the first coating 2 can be arranged on both surfaces of the porous substrate 1.

The porous substrate includes a polymer film, a multilayer polymer film, or a non-woven fabric formed of polymers selected from a group consisting of polyethylene, polypropylene, polyethylene terephthalate, polyphthaloyl diamine, polybutylene terephthalate, polyester, polyacetal, polyamide, polycarbonate, polyimide, polyetheretherketone, polyaryletherketone, polyetherimide, polyamide imide, polybenzimidazole, polyethersulfone, polyphenylene oxide, cycloolefin copolymer, polyphenylene sulfide, polyethylene naphthalene, and any combination thereof. The polyethylene is selected from the group consisting of high density polyethylene, low density polyethylene, ultrahigh molecular weight polyethylene, and any combinations thereof. The average pore size of the porous substrate 1 is 0.001 m to 10 m. The porosity of the porous substrate 1 is 5% to 95%. In addition, the porous substrate 1 has a thickness of 0.5 m to 50 m.

The first coating 2 includes a first polymer binder 3 and first inorganic particles 4. The first polymer binder 3 is composed of core-shell structured particles. A core of the first polymer binder 3 is a polymer formed by polymerizing of monomers selected from a group consisting of ethyl acrylate, butyl acrylate, ethyl methacrylate, styrene, chlorostyrene, fluorobenzene ethylene, methylstyrene, acrylic acid, methacrylic acid, maleic acid, and any combination thereof. A shell of the first polymer binder 3 is selected from polymers formed by polymerizing of monomers selected from a group consisting of methyl acrylate, ethyl acrylate, butyl acrylate, methyl methacrylate, ethyl methacrylate, butyl methacrylate, ethylene, chlorostyrene, fluorostyrene, methylstyrene, acrylonitrile, methyl acrylonitrile, and any combination thereof. In the present disclosure, by adopting the first polymer binder having a core-shell particle structure, on the one hand, the uniformity of the particles of the polymer binder is improved, and on the other hand, in the post-heating process, the shell of the first polymer binder may be softened first, and then the core of the first polymer binder may have bonding function. The core-shell structured particles of the first polymer binder can be obtained by an emulsion polymerization method commonly used in the art.

In some embodiments, the first inorganic particles 4 are selected from a group consisting of aluminium oxide, silicon dioxide, magnesium oxide, titanium oxide, hafnium dioxide, tin oxide, cerium oxide, nickel oxide, zinc oxide, calcium oxide, zirconia, yttrium oxide, silicon carbide, boehmite, aluminum hydroxide, magnesium hydroxide, calcium hydroxide, barium sulfate, and any combination thereof. The first inorganic particles 4 are inorganic materials with high hardness, and there are no obvious changes in the first inorganic particles 4 after swelling in an electrolyte and being hot-pressed during the formation process, and thus the first inorganic particles 4 can function as a supporting framework. At the same time, the first inorganic particles 4 have good endophilicity for the electrolyte, which is favorable for electrolyte transport.

Figure 2:
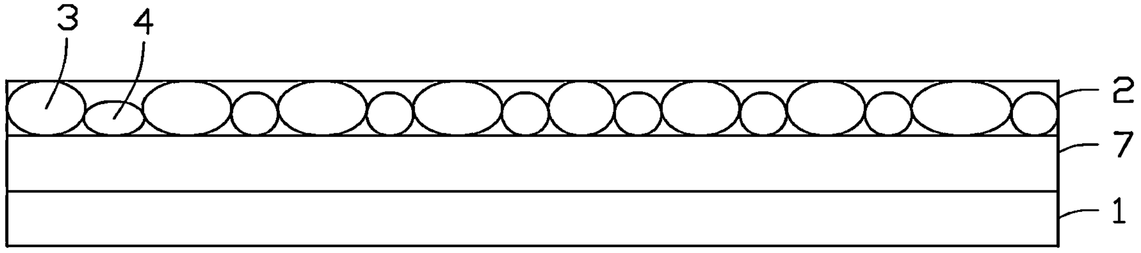
FIG. 2 is a schematic view of other embodiment of a separator according to the present disclosure.

FIG. 2 illustrates some embodiments of the separator further including a second coating 7 arranged between the porous substrate 1 and the first coating 2. The second coating 7 includes a second polymer binder and second particles. The second polymer binder of the second coating 7 is selected from a group consisting of copolymer of vinylidene fluoride-hexafluoropropylene, copolymer of vinylidene fluoride-trichloroethylene, polystyrene, polyacrylate, polyacrylic acid, polyacrylate, polyacrylonitrile, polyvinylpyrrolidone, polyacetic acid vinyl ester, copolymer of ethylene-vinyl acetate, polyimide, polyethylene oxide, cellulose acetate, cellulose acetate butyrate, cellulose acetate propionate, cyanoethyl amylopectin, cyanoethyl poly copolymerization of vinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene polymers, polyphthalamide, polyvinyl alcohol, styrene-butadiene copolymers, polyvinylidene fluoride, and any combination thereof. The polyacrylate is selected from a group consisting of polymethyl methacrylate, polyethyl acrylate, polypropyl acrylate, polybutyl acrylate, and any combination thereof.

In some embodiments, the second inorganic particles can also be selected from the group consisting of aluminium oxide, silicon dioxide, magnesium oxide, titanium oxide, hafnium dioxide, tin oxide, cerium oxide, nickel oxide, zinc oxide, calcium oxide, zirconia, yttrium oxide, silicon carbide, boehmite, aluminum hydroxide, magnesium hydroxide, calcium hydroxide, barium sulfate, and any combination thereof. The content of the second inorganic particles is not limited. However, based on the total weight of the second coating 7 as 100%, a weight percentage of the second inorganic particles is 40% to 99%. If the weight percentage of the second inorganic particles is less than 40%, the second polymer binder is present in a large amount, thereby reducing the interstitial volume formed between the second inorganic particles, reducing the pore size and porosity, and slowing down conduction of the lithium-ion, the performance of the electrochemical device decreases. If the weight percentage of the second inorganic particles is more than 99%, the content of the second polymer binder is too low to allow sufficient adhesion between the second inorganic particles, resulting in a reduction in the mechanical properties of the finally formed separator.

In some embodiments, the first coating 2 further includes an auxiliary binder, and a ratio of mass of the first polymer binder, the first inorganic particles, and the auxiliary binder is 10~80: 85~5:5~15. In some embodiments, the auxiliary binder is selected from the group consisting of copolymer of vinylidene fluoride-hexafluoropropylene, copolymer of vinylidene fluoride-trichloroethylene, polystyrene, polyacrylate, polyacrylic acid, polyacrylate, polyacrylonitrile, polyvinylpyrrolidone, polyacetic acid vinyl ester, copolymer of ethylene-vinyl acetate, polyimide, polyethylene oxide, cellulose acetate, cellulose acetate butyrate, cellulose acetate propionate, cyanoethyl amylopectin, cyanoethyl poly copolymerization of vinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene polymers, polyphthalamide, polyvinyl alcohol, styrene-butadiene copolymers, polyvinylidene fluoride, and any combination thereof. The polyacrylate is selected from a group consisting of polymethyl methacrylate, polyethyl acrylate, polypropyl acrylate, polybutyl acrylate, and any combination thereof. If the content of the first polymer binder is too low, the adhesive performance will decrease, and if the content of the first polymer binder is too high, the rate performance of the electrochemical device will decrease. The auxiliary binder helps to improve a bonding performance of the first coating. If the content of the auxiliary binder is too low, the improvement of the bonding performance is not obvious, and if the content of the auxiliary binder is too high, the rate performance of the electrochemical device becomes poor. If the content of the first inorganic particles is too low, the supporting effect will not be achieved, and if the content of the first inorganic particles is too high, it will affect the adhesion of the first polymer binder.

As shown in FIG. 1, in some embodiments, the first coating 2 includes a mono layer of particles. The mono layer of particles helps to increase the energy density of the electrochemical device, and can improve the rate performance and cycle performance of the electrochemical device.

In some embodiments, the first polymer binder is spherical or spheroidal particles, the first polymer binder satisfies the following formulas (1) to (3):

$$300\text{ nm} \le Dv50 \le 5000\text{ nm} \qquad \text{formula (1);}$$

$$Dv90 \le 1.5 \times Dv50 \qquad \text{formula (2);}$$

$$Dn10 \le 200\text{ nm} \qquad \text{formula (3);}$$

wherein Dv50 represents a particle size which reaches 50% of a cumulative volume from a side of small particle size in a granularity distribution on a volume basis, Dv90 represents a particle size which reaches 90% of a cumulative volume from a side of small particle size in a granularity distribution on a volume basis, and Dn10 represents a particle size which reaches 10% of a cumulative number from a side of small particle size in a granularity distribution on a number basis. The consistency of the particles of the first polymer binder satisfying the above formula is high, and the high consistency of the particles helps the first polymer binder to play a bonding role, and can improve the thickness consistency of the electrochemical device. If the particle size of the first polymer binder is too small, the rate performance of the electrochemical device will decrease, and if the particle size of the first polymer binder is too large, the adhesion performance will be affected.

In some embodiments, the separator satisfies the following formula (4):

$$0.3 \times Dv50 \text{ of the first polymer binder} \le Dv50 \text{ of the first inorganic particles} \le 0.7 \times Dv50 \text{ of the first polymer binder} \qquad \text{formula (4).}$$

The main function of the first inorganic particles is to prevent the first polymer binder from being pressed during the formation process, and if the particle size of the first inorganic particles is too small, the first inorganic particles cannot provide support. If the particle size of the first inorganic particles is too large, for example, if it is close to or larger than the particle size of the first polymer binder, the first polymer binder cannot perform a bonding effect during hot pressing, resulting in bonding failure. In addition, a space in a thickness direction supported by the first inorganic particles facilitates electrolyte transport.

The present disclosure further provides a lithium-ion battery including the above separator. In the present disclosure, the lithium-ion battery is merely an exemplary example of an electrochemical device, and the electrochemical device may further include other suitable devices. The lithium-ion battery includes a positive electrode plate, a negative electrode plate, and electrolyte. The separator of the present disclosure is inserted between the positive electrode plate and the negative electrode plate. The positive electrode plate includes positive current collector, the negative electrode plate includes negative current collector, the positive current collector can be aluminum foil or nickel foil, and the negative current collector can be aluminum foil or nickel foil.

Positive Electrode Plate

The positive electrode plate includes a positive electrode material capable of intercalation and deintercalation of lithium (Li) (hereinafter sometimes referred to as "positive electrode material capable of intercalation/deintercalation of lithium (Li)"). Examples of the positive electrode material capable of intercalation/deintercalation of lithium (Li) may include lithium cobaltate, nickel cobalt lithium manganate, nickel cobalt lithium aluminate, lithium manganate, iron manganese lithium phosphate, lithium vanadium phosphate, lithium oxide vanadium phosphate, lithium iron phosphate, lithium titanate, and lithium-rich manganese-based materials.

Specifically, the chemical formula of lithium cobaltate can be expressed as chemical formula 1:

$$Li_xCo_aM1_bO_{2-c} \qquad \text{chemical formula 1,}$$

wherein M1 is selected from a group consisting of nickel (Ni), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), and any combinations thereof, and the values of x, a, b, and c are respectively within the following ranges: $0.8 \le x \le 1.2$, $0.8 \le a \le -1$, $0 \le b \le 0.2$, $-0.1 \le c \le 0.2$;

the chemical formula of nickel cobalt lithium manganate or nickel cobalt lithium aluminate can be expressed as chemical formula 2:

$$Li_yNi_dM_2eO_{2-f} \qquad \text{chemical formula 2,}$$

wherein M2 is selected from a group consisting of cobalt (Co), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), yttrium (Sr), tungsten (W), zirconium (Zr), silicon (Si), and any combinations thereof, and the values of y, d, e, and f are respectively within the following ranges: $0.8 \le y \le 1.2$, $0.3 \le d \le 0.98$, $0.02 \le e \le 0.7$, $-0.1 \le f \le 0.2$;

the chemical formula of lithium manganate is expressed as chemical formula 3:

$$Li_2Mn_{2-g}M3_gO_{4-h} \qquad \text{chemical formula 3}$$

wherein M3 is selected from a group consisting of cobalt (Co), nickel (Ni), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), tungsten (W), and any combinations thereof, and the values of z, g and h are respectively within the following ranges: $0.8 \leq z \leq 1.2$, $0 \leq g \leq 1.0$, and $-0.2 \leq h \leq 0.2$.

Negative Electrode Plate

Negative electrode plate includes a negative electrode material capable of intercalation and deintercalation of lithium (Li) (hereinafter, sometimes referred to as "negative electrode material capable of intercalation/deintercalation of lithium (Li)"). Examples of the negative electrode material capable of intercalation/deintercalation of lithium (Li) can include a carbon material, a metal compound, an oxide, a sulfide, a nitride of lithium such as $LiN_3$, lithium metal, a metal which forms an alloy with lithium, and a polymer material.

Examples of carbon materials can include low graphitized carbon, easily graphitized carbon, artificial graphite, natural graphite, mesocarbon microbeads, soft carbon, hard carbon, pyrolytic carbon, coke, glassy carbon, organic polymer compound sintered body, carbon fiber and active carbon. Wherein coke can include pitch coke, needle coke, and petroleum coke. The organic polymer compound sintered body refers to materials obtained by calcining a polymer material such as a phenol plastic or a furan resin at a suitable temperature and carbonizing them, some of these materials are classified into low graphitized carbon or easily graphitized carbon. Examples of polymeric materials can include polyacetylene and polypyrrole.

Among these negative electrode materials capable of intercalation/deintercalation of lithium (Li), further, materials which have charge and discharge voltages close to the charge and discharge voltages of lithium metal are selected. This is because that the lower the charge and discharge voltages of the negative electrode material, the more easily the electrochemical device (such as lithium-ion battery) will have a higher energy density. The carbon material can be selected as the negative electrode material, since the crystal structure of the carbon material has only small changes during charging and discharging. Therefore, good cycle characteristics and high charge and discharge capacities can be obtained. In particular, graphite can be selected, since it provides a high electrochemical equivalent and energy density.

In addition, the negative electrode material capable of intercalation/deintercalation of lithium (Li) can include elemental lithium metal, metal elements and semi-metal elements capable of forming an alloy together with lithium (Li), and alloys and compounds including such elements, etc. In particular, they are used together with the carbon material, since good cycle characteristics and high energy density can be obtained in this case. In addition to alloys comprising two or more metal elements, alloys used herein further include alloys comprising one or more metal elements and one or more semi-metal elements. The alloys can be in the forms of solid solutions, eutectic crystals (eutectic mixtures), intermetallic compounds, and mixtures thereof.

Examples of metal elements and semi-metal elements can include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the above-described alloys and compounds can include a material expressed as a chemical formula: $Ma_sMb_tLi_u$ and a material expressed as a chemical formula: $Ma_pMc_qMd_r$. In these chemical formulas, Ma represents at least one of metal elements and semi-metal elements capable of forming alloys with lithium, Mb represents at least one of these metal elements and semi-metal elements other than lithium and Ma, Mc represents at least one of the non-metal elements, Md represents at least one of these metal elements and semi-metal elements other than Ma, and s, t, u, p, q, and r satisfy $s>0$, $t \geq 0$, $u \geq 0$, $p \geq 0$, $q>0$, and $r \geq 0$, respectively.

In addition, an inorganic compound that does not include lithium (Li) can be used in the negative electrode, such as $MnO_2$, $V_2O_5$, $V_6O_{13}$, NiS, and MoS.

Electrolyte

The lithium-ion battery described above further includes an electrolyte, which can be one or more of a gel electrolyte, a solid electrolyte, and a liquid electrolyte. The liquid electrolyte includes a lithium salt and a non-aqueous solvent.

The lithium salt is at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoborate. For example, $LiPF_6$ is used as the lithium salt, since it provides high-ionic conductivity and improve cycle performance.

The non-aqueous solvent can be a carbonate compound, a carboxylic acid ester compound, an ether compound, other organic solvents, or combinations thereof.

The carbonate compound can be a chain carbonate compound, a cyclic carbonate compound, a fluorinated carbonate compound, or combinations thereof.

Examples of chain carbonate compounds include diethyl carbonate (DEC), dimethyl carbonate (DMC), dipropyl carbonate (DPC), methylpropyl carbonate (MPC), ethyl propyl carbonate (EPC), methyl ethyl carbonate (MEC), and combinations thereof. Examples of the cyclic carbonate compounds include ethylene carbonate (EC), propylene carbonate (PC), butylene carbonate (BC), vinyl ethylene carbonate (VEC), and combinations thereof. Examples of the fluorocarbonate compound include fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethyl carbonate, 1-fluoro-1-methyl-ethylene carbonate, 1,2-difluoro-1-methylethylene carbonate, 1,1,2-trifluoro-2-methylethyl carbonate, trifluoromethyl ethylene carbonate, and combinations thereof.

Examples of carboxylic acid ester compounds include methyl acetate, ethyl acetate, n-propyl acetate, tert-butyl acetate, methyl propionate, ethyl propionate, γ-butyrolactone, decanolactone, valerolactone, mevalonolactone, caprolactone, methyl formate, and combinations thereof.

Examples of ether compounds include dibutyl ether, tetraethylene glycol dimethyl ether, diethylene glycol dimethyl ether, 1,2-dimethoxyethane, 1,2-diethoxyethane, ethoxy methoxy ethane, 2-methyltetrahydrofuran, tetrahydrofuran, and combinations thereof.

Examples of other organic solvents include dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate esters, and combinations thereof.

Although an example has been described above with a lithium-ion battery, those skilled in the art will realize that the separator of the present disclosure can be used in other suitable electrochemical devices. Such an electrochemical device includes any device that undergoes an electrochemical reaction, and specific examples thereof include all kinds of primary batteries, secondary batteries, fuel cells, solar cells, or capacitors.

The electrochemical device can be manufactured by conventional methods known to those skilled in the art. In one embodiment of the method of manufacturing an electrochemical device, the electrochemical device is formed with a separator interposed between a positive electrode plate and a negative electrode plate. Depending on the method of manufacturing the final product and the required properties, the liquid electrolyte can be injected in suitable steps during the manufacturing process of the electrochemical device. In other words, the liquid electrolyte can be injected before or during the final step of assembling the electrochemical device.

Specifically, the electrochemical device can be a lithium-ion battery, and the electrochemical device of the lithium-ion battery can be a wound type, a laminated (stacked) type, or a folded type.

Methods of preparation for lithium-ion battery which is used as an example are described with examples below. Those skilled in the art will understand that the preparation methods described in the present disclosure are merely examples, and any other suitable preparation methods are within the scope of the present disclosure.

The preparation process of the lithium-ion battery of the examples and comparative examples of the present disclosure is as follows.

Comparative Example 1

(1) Preparation of Separator

The boehmite and polyacrylate were mixed in a ratio of mass of 90:10 and dissolved in deionized water to form a second coating slurry. Subsequently, the second coating slurry was uniformly coated on one side of a porous substrate (polyethylene, thickness of 7 m, average pore size of 0.073 m, and porosity of 26%) by a micro concave coating method, and then dried to obtain a double-layer structure of the second coating layer and the porous substrate.

The polyvinylidene fluoride and the polyacrylate were mixed in a ratio of mass of 96:4 and dissolved in deionized water to form a first coating slurry. The Dv50 of the polyvinylidene fluoride was 600 nm. Then the first coating slurry was uniformly coated on the surface of the above double-layered structure of the second coating layer and the porous substrate by a micro-concave coating method, followed by drying to obtain a desired separator.

(2) Preparation of Positive Electrode Plate

The positive electrode active material (lithium cobaltate), the conductive agent (acetylene black), and the binder (polyvinylidene fluoride (PVDF)) were mixed in an N-methylpyrrolidone solvent system in a ratio of mass of 94:3:3, and thoroughly stirred and homogeneously mixed. Then, the mixture was coated on the positive electrode current collector (Al foil), followed by drying, cold pressing, and slitting to obtain a positive electrode plate.

(4) Preparation of Electrolyte

A solution prepared with lithium salt $LiPF_6$ and a non-aqueous organic solvent (ethylene carbonate (EC):diethyl carbonate (DEC):ethyl methyl carbonate (EMC):vinylene carbonate (VC)=8:85:5:2, by a ratio of mass) in a ratio of mass of 8:92 was used as the electrolyte of the lithium-ion battery.

(5) Preparation of Lithium-ion Battery

The positive electrode plate, the separator, and the negative electrode plate were stacked in that order so that the separator was arranged between the positive electrode plate and the negative electrode plate to ensure safe isolation, and the positive electrode plate, the separator, and the negative electrode plate were wound to obtain an electrochemical device. The electrochemical device was placed in a package, and the electrolyte was injected and packaged to obtain a lithium-ion battery.

Comparative Example 2

The preparation method was the same as that of comparative example 1, except that the ratio of mass of the polyvinylidene fluoride to the polyacrylate is 84:16 in this comparative example 2.

Comparative Example 3

The preparation method was the same as that of comparative example 1, and differences in the preparation method for the separator according to comparative example 3 are as follows.

The boehmite and polyacrylate were mixed in a ratio of mass of 90:10 and dissolved in deionized water to form a second coating slurry. Subsequently, the second coating slurry was uniformly coated on one side of a porous substrate (polyethylene, thickness of 7 m, average pore size of 0.073 m, and porosity of 26%) by a micro concave coating method, and then dried to obtain a double-layer structure of the second coating layer and the porous substrate.

The first polymer binder (core of polyethylene methacrylate, shell of copolymer of methyl methacrylate and methyl styrene) was added into a mixer, and the Dv50 of the first polymer binder was 600 nm, the Dv90 thereof was 823 nm, and Dn10 thereof was 121 nm. Then the auxiliary binder (polyacrylate) was added into the mixer, followed by stirring evenly, and finally the deionized water was added into the mixer to adjust the viscosity of the slurry. The ratio of mass of the first polymer binder to the auxiliary binder was 90:10. The slurry was coated on both surfaces of the above double-layer structure of the second coating and the porous substrate to form a first coating, followed by drying to obtain the separator.

Example 1

The preparation method was the same as that of comparative example 1, and differences in the preparation method for the separator according to example 1 are as follows.

The boehmite and polyacrylate were mixed in a ratio of mass of 90:10 and dissolved in deionized water to form a second coating slurry. Subsequently, the second coating slurry was uniformly coated on one side of a porous substrate (polyethylene, thickness of 7 m, average pore size of 0.073 m, and porosity of 26%) by a micro concave coating method, and then dried to obtain a double-layer structure of the second coating layer and the porous substrate.

The first polymer binder (core of polyethylene methacrylate, shell of copolymer of methyl methacrylate and methyl styrene) was added into a mixer, and the Dv50 of the first polymer binder was 300 nm, the Dv90 thereof was 276 nm, and the Dn10 thereof was 109 nm. Then the aluminum oxide particles (first inorganic particles) were added into the mixer in two portions of 50% each time, followed by stirring evenly. The Dv50 of the aluminum oxide particles was 150 nm. Then the auxiliary binder (polyacrylate) was added into the mixer, followed by stirring evenly, and finally the deionized water was added into the mixer to adjust the viscosity of the slurry. The ratio of mass of the first polymer binder, the aluminum oxide, and the auxiliary binder was 40:50:10. The slurry was coated on both surfaces of the above double-layer structure of the second coating and the porous substrate to form a first coating having a mono layer of particles, followed by drying to obtain the separator.

Example 2

The preparation method was the same as that of example 1, except that the Dv50 of the first polymer binder was 600 nm, the Dv90 thereof was 823 nm, the Dn10 thereof was 121 nm, and the Dv50 of the aluminum oxide particles was 300 nm in this example 2.

Example 3

The preparation method was the same as that of example 1, except that the Dv50 of the first polymer binder was 1200 nm, the Dv90 thereof was 1670 nm, the Dn10 thereof was 133 nm, and the Dv50 of the aluminum oxide particles was 600 nm in this example 3.

Example 4

The preparation method was the same as that of example 1, except that the Dv50 of the first polymer binder was 1600 nm, the Dv90 thereof was 2253 nm, Dn10 thereof was 136 nm, and the Dv50 of the aluminum oxide particles was 800 nm in this example 4.

Example 5

The preparation method was the same as that of example 1, except that the Dv50 of the first polymer binder was 2800 nm, the Dv90 thereof was 3891 nm, the Dn10 thereof was 152 nm, and the Dv50 of the aluminum oxide particles was 1400 nm in this example 5.

Example 6

The preparation method was the same as that of example 1, except that the Dv50 of the first polymer binder was 4000 nm, the Dv90 thereof was 5391 nm, the Dn10 thereof was 172 nm, and the Dv50 of the aluminum oxide particles was 2000 nm in this example 6.

Example 7

The preparation method was the same as that of example 1, except that the Dv50 of the first polymer binder was 5000 nm, the Dv90 thereof was 6931 nm, the Dn10 thereof was 196 nm, and the Dv50 of the aluminum oxide particles was 2500 nm in this example 7.

Example 8

The preparation method was the same as that of example 2, except that the ratio of mass of the first polymer binder, the aluminum oxide, and the auxiliary binder was 10:80:10 in this example 8.

Example 9

The preparation method was the same as that of example 2, except that the ratio of mass of the first polymer binder, the aluminum oxide, and the auxiliary binder was 30:60:10 in this example 9.

Example 10

The preparation method was the same as that of example 2, except that the ratio of mass of the first polymer binder, the aluminum oxide, and the auxiliary binder was 50:40:10 in this example 10.

Example 11

The preparation method was the same as that of example 2, except that the ratio of mass of the first polymer binder, the aluminum oxide, and the auxiliary binder was 60:30:10 in this example 11.

Example 12

The preparation method was the same as that of example 2, except that the ratio of mass of the first polymer binder, the aluminum oxide, and the auxiliary binder was 80:10:10 in this example 12.

Example 13

The preparation method was the same as that of example 2, except that the Dv50 of the aluminum oxide particles was 180 nm in this example 13.

Example 14

The preparation method was the same as that of example 2, except that the Dv50 of the aluminum oxide particles was 240 nm in this example 14.

Example 15

The preparation method was the same as that of example 2, except that the Dv50 of the aluminum oxide particles was 360 nm in this example 15.

Example 16

The preparation method was the same as that of example 2, except that the Dv50 of the aluminum oxide particles was 420 nm in this example 16.

Example 17

The preparation method was the same as that of example 2, except that the Dv90 of the first polymer binder was 1132 nm, and the Dn10 thereof was 182 nm in this example 17.

Example 18

The preparation method was the same as that of example 2, except that the Dv90 of the first polymer binder was 886 nm, and the Dn10 thereof was 279 nm in this example 18.

Example 19

The preparation method was the same as that of example 2, except that the Dv90 of the first polymer binder was 1097 nm, and the Dn10 thereof was 273 nm in this example 19.

Bonding force and rate performance tests were performed on the lithium ion batteries of the examples and comparative examples. The specific test methods are as follows:

(1) Bonding Force Test

The 1800 peel test standard was used to test the dry-pressure adhesion between the separator and the positive and negative pole pieces. The separator and the positive and negative electrode plates were cut into samples with sizes of 54.2 mm×72.5 mm. The separator was placed with the positive/negative electrode plates, followed by hot pressing under conditions of 85° C., 1 Mpa, and 85S, the composite sample was cut into strips with sizes of 15 mm×54.2 mm, and the bonding force was tested according to the 1800 peel test standard.

(2) Ratio Performance Test

The temperature of an incubator was set to 25° C. The lithium-ion battery was charged to 4.4V at a constant current of 0.5 C, then to 0.05 C at such constant voltage, rested for 5 minutes, and further discharged to 3V at a constant current of 0.1 C, and rested for 5 minutes. The discharge capacity at the constant current of 0.1 C is base 100%. Then the lithium-ion battery was charged to 4.4V at a constant current of 0.5 C, then was charged to 0.05 C at such constant voltage, rested for 5 minutes, and was further discharged to 3V at a constant current of 2 C. The discharge capacity at this time was recorded for rate performance test. The 2 C discharge rate performance =2 C discharge capacity/0.1 C discharge capacity×100%.

The test parameters and test results of examples 1-9 and comparative examples 1-3 are shown in Table 1 below. For comparison, the results in Table 1 are shown in groups.

By comparing examples 1-7, it is clear that, with the increase of the particle size of the first polymer binder, the dry-pressure bonding force between the separator and the positive/negative electrode tabs tends to decrease, and the rate performance of the lithium-ion battery is gradually improved.

By comparing examples 2 and 8-12, it is clear that, with the increase of the content of the first polymer binder, the dry-pressure bonding force between the separator and the positive/negative electrode tabs tends to decrease, and the rate performance of the lithium-ion battery tends to increase.

By comparing examples 2 and 13-16, it is clear that the Dv50 of first inorganic particles and the Dv50 of the first polymer binder should satisfy 0.3×Dv50 of the first polymer binder≤Dv50 of the first inorganic particles≤0.7×Dv50 of the first polymer binder. This is because, if the particle size of the first inorganic particles is too small, the first inorganic particles cannot provide support. If the particle size of the first inorganic particles is too large, for example, it is close to or larger than the particle size of the first polymer binder, the first polymer binder cannot perform a bonding effect during hot pressing, resulting in bonding failure. With the increase of ratio of the Dv50 of the first inorganic particles to the Dv50 of the first polymer binder, the dry-pressure bonding force between the separator and the positive/negative electrode plate tends to decrease, and the rate performance of the lithium-ion battery tends to increase.

TABLE 1

| | Dv50 of first polymer binder (nm) | Dv90 of first polymer binder (nm) | Dn10 of first polymer binder (nm) | Ratio of Dv50 of first inorganic particles to Dv50 of first polymer binder | Content of first inorganic particles | Content of first polymer binder | Content of auxiliary binder | Bonding force between separator and positive electrode plate (N/m) | Bonding force between separator and negative electrode plate (N/m) | Rating performance (2C) |
|---|---|---|---|---|---|---|---|---|---|---|
| Example 1 | 300 | 276 | 109 | 0.5 | 40 wt % | 50 wt % | 10 wt % | 12.5 | 10.2 | 75.1% |
| Example 2 | 600 | 823 | 121 | 0.5 | 40 wt % | 50 wt % | 10 wt % | 11.3 | 7.6 | 76.2% |
| Example 3 | 1200 | 1670 | 133 | 0.5 | 40 wt % | 50 wt % | 10 wt % | 10.3 | 7.6 | 77.6% |
| Example 4 | 1600 | 2253 | 136 | 0.5 | 40 wt % | 50 wt % | 10 wt % | 9.5 | 6.8 | 78.8% |
| Example 5 | 2800 | 3891 | 152 | 0.5 | 40 wt % | 50 wt % | 10 wt % | 6.7 | 3.8 | 84.1% |
| Example 6 | 4000 | 5391 | 172 | 0.5 | 40 wt % | 50 wt % | 10 wt % | 5.6 | 3. | 85.7% |
| Example 7 | 5000 | 6931 | 196 | 0.5 | 40 wt % | 50 wt % | 10 wt % | 4.2 | 2.0 | 87.5% |
| Example 8 | 600 | 823 | 121 | 0.5 | 10 wt % | 80 wt % | 10 wt % | 14.2 | 12.5 | 72.2% |
| Example 9 | 600 | 823 | 121 | 0.5 | 30 wt % | 60 wt % | 10 wt % | 12.6 | 10.8 | 74.2% |
| Example 2 | 600 | 823 | 121 | 0.5 | 40 wt % | 50 wt % | 10 wt % | 11.3 | 8.9 | 76.2% |
| Example 10 | 600 | 823 | 121 | 0.5 | 50 wt % | 40 wt % | 10 wt % | 10.4 | 7.7 | 77.8% |
| Example 11 | 600 | 823 | 121 | 0.5 | 60 wt % | 30 wt % | 10 wt % | 9.3 | 6.6 | 79.1% |
| Example 12 | 600 | 823 | 121 | 0.5 | 80 wt % | 10 wt % | 10 wt % | 8.4 | 5.6 | 78.8% |
| Example 13 | 600 | 823 | 121 | 0.3 | 40 wt % | 50 wt % | 10 wt % | 13.5 | 12.1 | 73.2% |
| Example 14 | 600 | 823 | 121 | 0.4 | 40 wt % | 50 wt % | 10 wt % | 12.6 | 10.5 | 74.7% |
| Example 2 | 600 | 823 | 121 | 0.5 | 40 wt % | 50 wt % | 10 wt % | 11.3 | 8.9 | 76.2% |
| Example 15 | 600 | 823 | 121 | 0.6 | 40 wt % | 50 wt % | 10 wt % | 10.1 | 7.8 | 78.1% |
| Example 16 | 600 | 823 | 121 | 0.7 | 40 wt % | 50 wt % | 10 wt % | 8.4 | 6.5 | 79.7% |
| Example 2 | 600 | 823 | 121 | 0.5 | 40 wt % | 50 wt % | 10 wt % | 11.3 | 8.9 | 76.2% |
| Example 17 | 600 | 1132 | 182 | 0.5 | 40 wt % | 50 wt % | 10 wt % | 10.2 | 7.8 | 77.2% |
| Example 18 | 600 | 886 | 279 | 0.5 | 40 wt % | 50 wt % | 10 wt % | 10.9 | 8.4 | 75.7% |
| Example 19 | 600 | 1097 | 273 | 0.5 | 40 wt % | 50 wt % | 10 wt % | 9.9 | 7.4 | 75.8% |
| Comparative example 1 | 600 | / | / | / | / | 96 wt % | 4 wt % | 6.5 | 4.8 | 69.3% |
| Comparative example 2 | 600 | / | / | / | / | 84 wt % | 16 wt % | 11.2 | 9.5 | 60.5% |
| Comparative example 3 | 600 | 823 | 121 | / | / | 90 wt % | 10 wt % | 14.5 | 12.8 | 68.2% |

By comparing examples 1-19 and comparative examples 1-2, it is clear that by using the first inorganic particles in the first coating, the dry-pressure bonding force between the separator and the positive/negative electrode plates is increased, or the rate performance is significantly improved.

By comparing examples 2 and 17-19, it is clear that when the particle size is too large to satisfy the relationship of Dv90≤1.5×Dv50 or Dn10≤200 nm, the consistency of the particles of the first polymer binder is poor, the dry-pressure bonding force between the separator and the positive/negative electrode plate is reduced, and the small Dn10 will affect the rate performance of the lithium-ion battery.

By comparing examples 2, 8-12 and comparative example 3, it is clear that by using the first inorganic particles in the first coating, the rate performance of the lithium ion battery is significantly improved.

Figure 3:
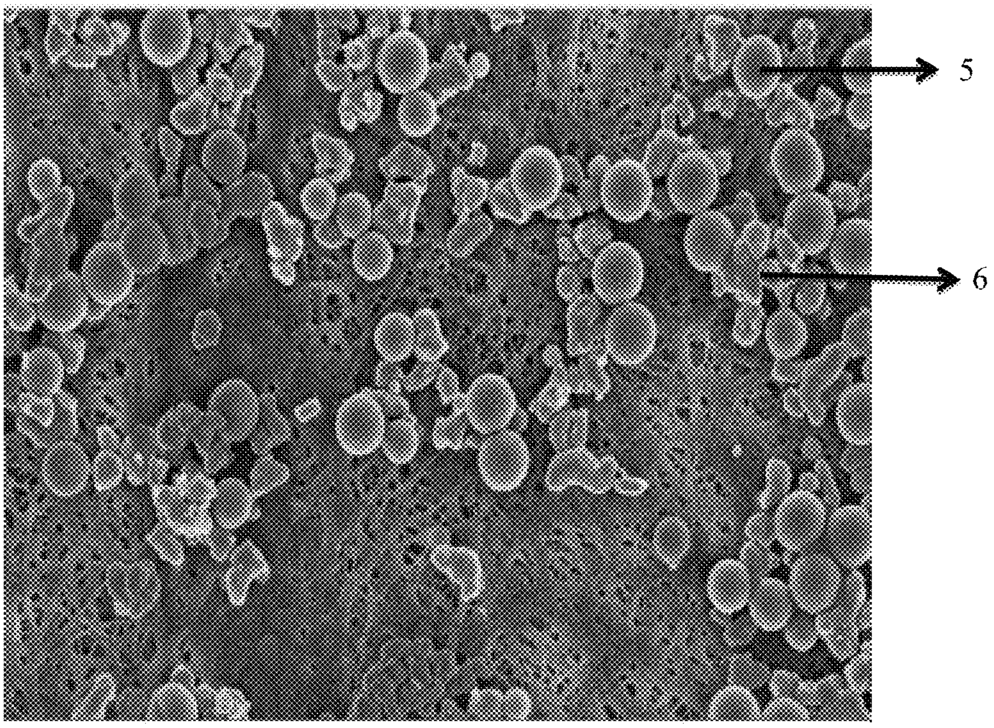
FIG. 3 is a scanning electron microscope (SEM) image of a separator at 1000 times magnification in an example 2 as disclosed in the present disclosure.

Referring to FIG. 3, a scanning electron microscope (SEM) image of a separator prepared in example 2 of the present disclosure is observed at a magnification of 1000 times, where number 5 refers to the first polymer binder and number 6 refers to the first inorganic particles, and the particle distribution of the first polymer binder is uniform.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A separator comprising:

a porous substrate; and a first coating disposed on at least one surface of the porous substrate;

the first coating comprises first inorganic particles and a first polymer binder, wherein the first polymer binder is composed of core-shell structured particles;

wherein the separator satisfies formula (4):

$$0.3\times Dv50 \text{ of the first polymer binder} \leq Dv50 \text{ of the first inorganic particles} < 0.6\times Dv50 \text{ of the first polymer binder} \quad \text{formula (4);}$$

Dv50 represents a particle size at which cumulative volume reaches 50% from a side of smaller towards larger size of the particles in a particle size distribution of the corresponding particles on a volume basis.

2. The separator of claim 1, further comprising a second coating arranged between the porous substrate and the first coating, wherein the second coating comprises a second polymer binder and second inorganic particles.

3. The separator of claim 1, wherein the first polymer binder satisfies formulas (1) to (3):

$$300\text{ nm} \leq Dv50 \text{ of the first polymer binder} \leq 5000\text{ nm} \quad \text{formula (1);}$$

$$Dv90 \text{ of the first polymer binder} \leq 1.5\times Dv50 \text{ of the first polymer binder} \quad \text{formula (2);}$$

$$Dn10 \text{ of the first polymer binder} \leq 200\text{ nm} \quad \text{formula (3);}$$

wherein Dv90 of the first polymer binder represents a particle size at which cumulative volume reaches 90% from a side of smaller towards larger size of the particles in the particle size distribution of the first polymer binder on a volume basis and Dn10 represents a particle size at which cumulative number reaches 10% from a side of smaller towards larger size of the particles in a particle size distribution of the first polymer binder on a number basis.

4. The separator of claim 1, wherein the first coating further comprises an auxiliary binder, and a mass ratio of the first polymer binder, the first inorganic particles, and the auxiliary binder is 10-80:85-5:5-15.

5. The separator of claim 1, wherein the Dv50 of the first inorganic particles is in a range of 240 nm to 420 nm.

6. The separator of claim 1, wherein a core of the first polymer binder is a polymer formed by polymerizing of monomers selected from the group consisting of ethyl acrylate, butyl acrylate, ethyl methacrylate, styrene, chlorostyrene, fluorobenzene ethylene, methylstyrene, acrylic acid, methacrylic acid, maleic acid, and any combination thereof.

7. The separator of claim 1, wherein a shell of the first polymer binder is a polymer formed by polymerizing of monomers selected from the group consisting of methyl acrylate, ethyl acrylate, butyl acrylate, methyl methacrylate, ethyl methacrylate, butyl methacrylate, ethylene, chlorostyrene, fluorostyrene, methylstyrene, acrylonitrile, methyl acrylonitrile, and any combination thereof.

8. The separator of claim 1, wherein the first inorganic particles are selected from the group consisting of aluminium oxide, silicon dioxide, magnesium oxide, titanium oxide, hafnium dioxide, tin oxide, cerium oxide, nickel oxide, zinc oxide, calcium oxide, zirconia, yttrium oxide, silicon carbide, boehmite, aluminum hydroxide, magnesium hydroxide, calcium hydroxide, barium sulfate, and any combination thereof.

9. The separator of claim 1, wherein the first inorganic particles and the core-shell structured particles in the first coating are arranged as a mono layer of particles.

10. An electrochemical device comprising:

positive electrode plate;

negative electrode plate; and a separator arranged between the positive electrode plate and the negative electrode plate, the separator comprising:

a porous substrate; and a first coating disposed on at least one surface of the porous substrate;

the first coating comprises first inorganic particles and a first polymer binder, wherein the first polymer binder is composed of core-shell structured particles;

wherein the separator satisfies formula (4):

$$0.3\times Dv50 \text{ of the first polymer binder} \leq Dv50 \text{ of the first inorganic particles} < 0.6\times Dv50 \text{ of the first polymer binder} \quad \text{formula (4);}$$

Dv50 represents a particle size at which cumulative volume reaches 50% from a side of smaller towards larger size of the particles in a particle size distribution of the corresponding particles on a volume basis.

11. The electrochemical device of claim 10, further comprising a second coating arranged between the porous substrate and the first coating, wherein the second coating comprises comprising a second polymer binder and second inorganic particles.

12. The electrochemical device of claim 10, wherein the first polymer binder satisfies formulas (1) to (3):

$$300\text{ nm} \leq Dv50 \text{ of the first polymer binder} \leq 5000\text{ nm} \quad \text{formula (1);}$$

$$Dv90 \text{of the first polymer binder} \leq 1.5\times Dv50 \text{of the first polymer binder} \quad \text{formula (2);}$$

$$Dn10 \text{of the first polymer binder} \leq 200\text{ nm} \quad \text{formula (3);}$$

wherein Dv90 represents a particle size at which cumulative volume reaches 90% from a side of smaller towards larger size of the particles in the particle size distribution of the first polymer binder on a volume basis and Dn10 represents a particle size at which cumulative number reaches 10% from a side of smaller towards larger size of the particles in the particle size distribution of the first polymer binder on a number basis.

13. The electrochemical device of claim 10, wherein the first coating further comprises an auxiliary binder, and a mass ratio of the first polymer binder, the first inorganic particles, and the auxiliary binder is 10~80: 85~5: 5~15.

14. The electrochemical device of claim 10, wherein the Dv50 of the first inorganic particles is in a range of 240 nm to 420 nm.

15. The electrochemical device of claim 10, wherein a core of the first polymer binder is a polymer formed by polymerizing of monomers selected from the group consisting of ethyl acrylate, butyl acrylate, ethyl methacrylate, styrene, chlorostyrene, fluorobenzene ethylene, methylstyrene, acrylic acid, methacrylic acid, maleic acid, and any combination thereof.

16. The electrochemical device of claim 10, wherein a shell of the first polymer binder is a polymer formed by polymerizing of monomers selected from the group consisting of methyl acrylate, ethyl acrylate, butyl acrylate, methyl methacrylate, ethyl methacrylate, butyl methacrylate, ethylene, chlorostyrene, fluorostyrene, methylstyrene, acrylonitrile, methyl acrylonitrile, and any combination thereof.

17. The electrochemical device of claim 10, wherein the first inorganic particles are selected from the group consisting of aluminum oxide, silicon dioxide, magnesium oxide, titanium oxide, hafnium dioxide, tin oxide, cerium oxide, nickel oxide, zinc oxide, calcium oxide, zirconia, yttrium oxide, silicon carbide, boehmite, aluminum hydroxide, magnesium hydroxide, calcium hydroxide, barium sulfate, and any combination thereof.

18. The electrochemical device of claim 10, wherein the first inorganic particles and the core-shell structured particles in the first coating are arranged as a mono layer of particles.

* * * * *